July 18, 1972   R. ROBERTS   3,677,845
METHOD FOR THE IN SITU COVERING OF LARGE DIAMETER PROCESS
ROLLS WITH HEAT SHRINKABLE FILMS OF FLUORINATED
ETHYLENE POLYMERS AND THE LIKE.
Filed July 24, 1970

INVENTOR.
ROBERT ROBERTS
BY Mandeville & Schweitzer

ATTORNEYS

United States Patent Office 3,677,845
Patented July 18, 1972

---

3,677,845
METHOD FOR THE IN SITU COVERING OF LARGE DIAMETER PROCESS ROLLS WITH HEAT SHRINKABLE FILMS OF FLUORINATED ETHYLENE POLYMERS AND THE LIKE
Robert Roberts, Wilmington, Del., assignor to Fluorodynamics, Inc., Newark, Del.
Filed July 24, 1970, Ser. No. 57,997
Int. Cl. B29c *27/00;* C09j *5/02, 5/06*
U.S. Cl. 156—3
10 Claims

ABSTRACT OF THE DISCLOSURE

A method of covering large diameter rolls with a heat shrinkable covering material, particularly high molecular weight, high viscosity, thermoplastic materials, such as Teflon FEP film, is disclosed, which includes in situ heat seal joining of an oriented film to form a heat shrinkable tube. The new method provides for a complete circumferential adhesive bond between the roll surface and the relatively non-adherent covering material, specifically including the region of the heat seal joint, by utilizing a narrow sealing strip along the longitudinal joint of the covering material. The sealing strip is heat sealable on one side to the covering material and adhesively joinable to the roll surface of its other side.

BACKGROUND AND SUMMARY OF THE INVENTION

The invention pertains to the covering of large diameter rolls, such as paper machine dryer drums, with a covering of protective material, typically a heat shrinkable fluorocarbon polymer film but also with other high molecular weight, high viscosity, thermoplastic materials. More specifically, the invention provides a process for providing large diameter rolls with an adhesively secured covering of Teflon FEP or similar relatively non-adherent polymer material in a practical and economical manner. For convenience of reference, such materials shall hereinafter be called non-adherent polymers.

The covering of metal rolls, such as paper machine dryer drums, with a Teflon FEP film covering is desirable in many instances because the film imparts chemical inertness, resistance to corrosion, freedom from adhesion to other surfaces, and other advantageous characteristics to the drum surface. Because of the large diameter and weight of rolls of this type, and the difficulties involved in removing such rolls from their supporting structure, it may be impractical to prefabricate the covering material into heat-shrinkable tubular form and then apply it axially over the roll as is customarily done with smaller rolls. The on-site fabrication and in situ installation of the covering material on the larger rolls is therefore usually necessary or expedient.

Non-adherent polymers, such as Teflon FEP fluorinated ethylene polymer resins are very advantageous for use as roll covering materials because of their desirable surface characteristics. They can also be made heat shrinkable, which means that, after being initially distended and cooled, they will tend to return to their original dimensions when subsequently heated. This property of heat shrinkable films is utilized to form a tight covering on cylindrical objects of predetermined size by starting with a tube of the material having a relaxed diameter slightly less than the diameter of the object to be covered. The tube is initially heated and distended to a diameter slightly greater than the predetermined diameter of the object so that it will easily fit around its circumference. The tube is subsequently heat shrunk while around the object and forms a tight covering of the surface of the object. Alternatively, the tube may be formed in the first instance of pre-oriented film.

Even where it is preferable to install the covering material for large diameter rolls in situ, it is advantageous initially to pre-form a section of the covering material at the supplier's plant into a heat shrinkable tube having a relaxed diameter slightly smaller than the roll diameter. This pre-form can be conveniently etched or otherwise heated to impart adhesion characteristics. Thereafter, the heat-shrinkable pre-form is slit open and shipped in web form to the site of the process roll to be covered. The flat web of covering material is there formed into a tube around the roll, with opposed edges overlapped, and heat sealed to again form a tube. The tube is subsequently heat shrunk to tightly conform to the surface of the roll. Advantageously, in order to obtain the desired permanency of the bond between the tube of covering material and the roll surface, a thermosetting adhesive composition is interposed between the inner surface of the heat shrinkable tube and the roll surface either before or (more typically) after heat shrinking.

When utilizing an adhesive as an additional bonding means between the roll and a non-adherent polymer covering material, it is necessary to treat the inner surface of the covering material in order to make it reasonably receptive to adhesive bonding. The surface treatment of a covering material such as Teflon FEP to improve its adhesion characteristics is usually a chemical etch. However, chemical etching of the film surface also has the detrimental effect of impairing the heat sealability of the film edges when they are to be heat fused in an overlapping relationship. It is therefore necessary to remove the reaction product of the etching step along the edge extremities of the film in order to permit a reliable heat sealed joint to be formed. This, however, leads to the further problem of providing a suitable adhesive bond between the roll surface and the covering material along the region of the heat sealed longitudinal joint.

Pursuant to the invention, where a thermally fused section of fluorinated ethylene polymer or other non-adherent film is to be adhesively secured to a substrate, such as the surface of a process roll, a transition strip is provided which has characteristics enabling it to be thermally fused with the basic non-adherent (FEP) film, in the region of the seam, and also is receptive to adhesives used in securing the non-adherent film to its substrate. The transition strip comprises a preformed laminate of the material of the basic film or at least a material compatible with the basic film, with a material, such as du Pont's polyimide material, Kapton, which is adhesively securable to the process roll. The transition strip is located along the overlapping edges of the basic film, prior to thermal fusion thereof, and coincides substantially in length and width with the area of the film which has been cleaned of the reaction product of the etching step. During the subsequent fusing operation, the transition strip becomes an integral part of the fused seam. Along the surface to be adhesively secured, the inner surface of the transition strip is exposed for adhesive bonding, rather than an unetched portion of the basic film.

For a better understannding of the invention, reference should be made to the following detailed description and to the accompanying drawing.

DESCRIPTION OF PREFERRED EMBODIMENTS

Figure 1:
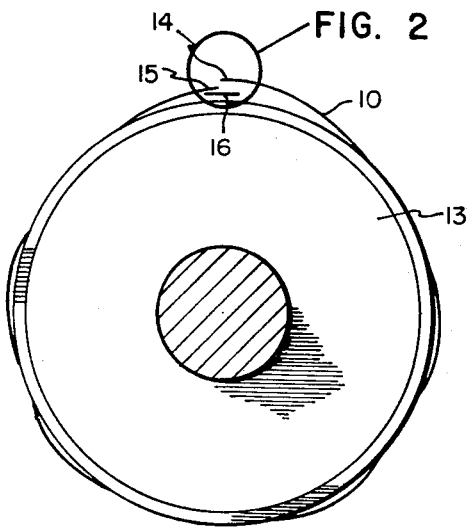
FIG. 1 is a schematic drawing of a film showing a heat shrinkable film of fluorinated ethylene polymer or other non-adherent polymer in position to be applied to the surface of a large diameter roll in accordance with the invention.
Figure 2:
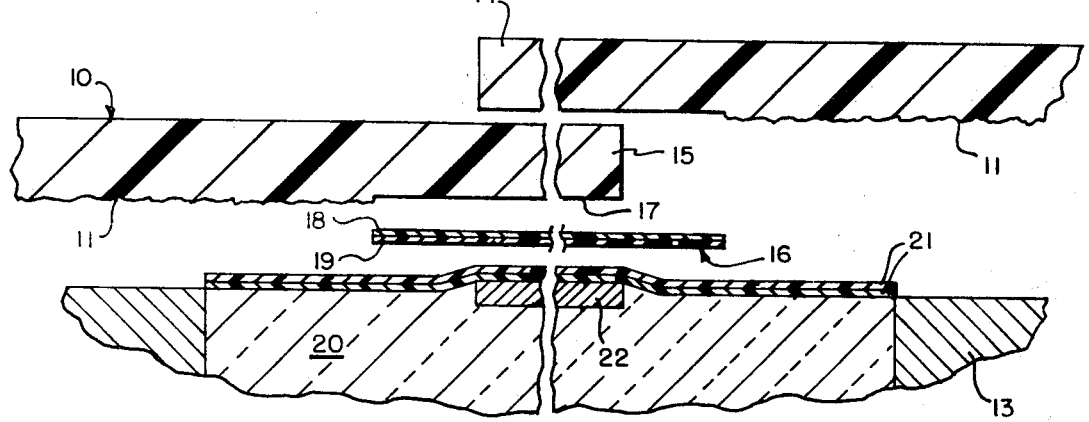
FIG. 2 is a close-up enlargement of the circled area of FIG. 1 showing details of the new seam structure before heat sealing.

In the process according to the invention, for in situ covering of a process roll with a heat shrinkable film of non-adherent material such as Du Pont's fluorinated ethylene polymer, Teflon FEP 160 film, it is desirable to install a circumferentially continuous tube of the film in a distended condition. The distended circumference of the tube may be 10% or so greater than the circumference of the process roll, and the "relaxed" circumference of the tube may be 5% or so less than the circumference of the process roll. Thus, after installation of the tube in its distended condition, heat is appropriately applied to the film, causing it to shrink toward its "relaxed" condition and thus be brought into snug fitting relation to the surface of the process roll.

Where the covering film is to be adhesively secured to the process roll, as contemplated by the present invention, an appropriate adhesive material, in itself known in the art, may be applied to the process roll surface, usually after the heat shrinking procedure. Typically, the adhesive is of a thermosetting type and is cured by the application of heat.

Because of the non-adherent characteristics of fluorinated ethylene polymer or other covering material, it is necessary to process the interior surface of the polymer film to cause it to be receptive to the adhesive. For Teflon FEP 160 film, this surface treating process advantageously is by way of a chemical etch, and a variety of liquid chemical etches are known for this purpose. A typical one is described in U.S. Pat. No. 2,789,063.

As will be appreciated, the liquid chemical etching of one surface of an FEP web must be performed with great care to avoid the accidental etching of any of the exterior surface of the film. This is somewhat complicated by the fact that the etching process involves contact of the liquid etching chemical with the fluorinated ethylene polymer for a period of time. In commercial practice, it has been proven very satisfactory to perform the etching operation by first preparing the FEP film into its ultimate tubular form, tightly clamping the ends of the tube and injecting an appropriate quantity of the etching chemical into the thus-formed "container." The etching chemical is thus safely confined to contact with the desired film surface throughout the necessary etching period. The clamped end extremities of the tube which are not adequately in contact with the etching liquid may be trimmed and discarded.

Where the process roll requires in situ installation, as is contemplated by the present invention, the foregoing procedure is followed, in that a desired web length of the fluorinated ethylene polymer film is first joined at its ends to form a tubular section of the desired large circumference. This advantageously is accomplished by an in-plant heat fusing operation as described in the copending application Ser. No. 58,052, filed July 24, 1970, by Robert Roberts for "Sealing Apparatus for Manufacturing Roller Coverings and the Like." After this initial in-plant fusion, the chemical etching procedure is followed, as set forth above.

Unless pre-oriented film is utilized, it is advantageous to distend the tube in the circumferential direction, to impart the desired heat-shrinking characteristics to the film. This may be accomplished by internal pressurization of the tube against a confining cylinder, or by mechanical means, as desired. Usually, for coverings of larger diameters, distension of the film by internal pressurization is not practical.

The etched and distended tube is then severed open, to provide a web of predetermined length, which is fully etched on the surface which is ultimately to be adhesively bonded to a process roll. If desired, the initial tubing may be severed on both sides of the initial seam, and a narrow strip of material, including the seam, can be discarded. The etched length of film thus produced can be shipped to the site of the process roll for in situ installation.

Referring now to the drawing, a film 10 of non-adherent polymer, such as fluorinated ethylene polymer material, having a chemically etched or otherwise treated interior surface 11, is initially loosely applied about the surface of a process roll 13. At this stage, the film is distended in a circumferential direction, as a result of in-plant procedures prior to shipment to the site of the process roll. A preferred covering material is Du Pont's Teflon FEP 160 film having a thickness of about 20 mils.

As set forth in the before-mentioned copending application, an in situ installation on the process roll 13 is advantageously carried out using a special apparatus installed on the roll and including a clamping bar 20 secured directly to the roll surface and encircled by the covering film 10. The edge portions of film are brought into overlapping relation over the clamping bar, in vertical alignment with one or more thin films 21 of polyimide (Kapton) and a ribbon-like heating element 22. An overlap of one-sixteenth to one-eighth inch is advantageous. After proper alignment of the film edges, the film is heated and maintained under clamping pressure in the region of the seam. Typically, for fusing Teflon FEP 160, heating to a temperature of 600–630° F. for a period of 20 minutes or so, while maintaining a clamping pressure on the order of 50 pounds per square inch along the full length of the seam, results in an optimum fused seam. This is permitted to cool to around 200° F. before clamping pressure is released.

In order to effect heat fusion of the film ends, it is first necessary to remove the reaction products from the chemical etch, or other surface treatment, in the region of the fused seam. This exposes virgin polymer and enables the heat fusion to occur without interference from the surface treatment products. When using Teflon FEP 160, the removal of the reaction products advantageously is effected by scraping the etched surface of the film with a bladed instrument, to expose virgin polymer along strips 14, 15 about one-half inch or less wide along each edge.

While removal of the etching reaction products from the film enables the heat fusion operation to be effected properly, a complication is thereby introduced with respect to the adhesive bonding of the covering to a process roll in the region of the fused seam. This problem is obviated, in accordance with the invention, by the introduction of a transition strip 16 along the inside of the fused seam. This transition strip is of a character enabling it to fuse to the covering film in the region of the seam while providing an adhesively bondable surface facing the process roll. More specifically, the transition strip 16 comprises a thin, laminated strip, the upper component 18 of which is a film which is the same as or at least fully compatible with and fusible by heat to the film constituting the basic covering material. Thus, the component layer 18 of laminate desirably is Du Pont's Teflon FEP 160 where the covering material is Teflon 160. The fusible component 18 of the transition strip is prelaminated to an underlying adhesively bondable component 19, in accordance with the invention. In one advantageous form of the invention, the FEP component 18 is adhesively pre-laminated to a second film component of polyimide film, desirably that available as of the date hereof from Du Pont under their trade identification Kapton. The pre-laminated transition strip 16 may be very thin, comprising individual components of about ½ mil thickness each, for a total overall thickness of about 1 mil. In another advantageous form of the invention, the fusible component of the strip is formed of Teflon FEP 160 and the adhesively bondable component is constituted by a pre-plated surface layer of aluminum on one side of the Teflon. A variety of combinations are possible, provided the fusible component is thermally fusible with the principal covering material during the seaming operation and the adhesively bondable component is capable of withstanding and maintaining its integrity during the seaming operation and is thereafter adhesively bondable to the process roller.

In the preparation of the fused seam, the transition strip 16 is first laid along the clamping bar 20, aligned directly above the heating element 22, and then the film ends 14, 15, from which the etching reaction products have been scraped, are aligned to abutting or slightly overlapping relation, directly over the transition strip. The width of the transition strip 16 may be approximately one-half inch, and the edge extremities of the transition strip are carefully aligned with the edges of the scraped areas 14, 15 of the main film 10.

In accordance with the invention, while the seam is being fused under heat and pressure, the fusible component 18 (FEP) of the transition strip is also fused to the basic film 10 in the region of and along the entire length of the fused seam, and the adhesively bondable component 19 (Kapton) remains intact and is exposed on the interior of the seam, presenting an adhesively bondable surface which spans substantially the entire area of the film which previously was scraped free of reaction products.

Figure 3:
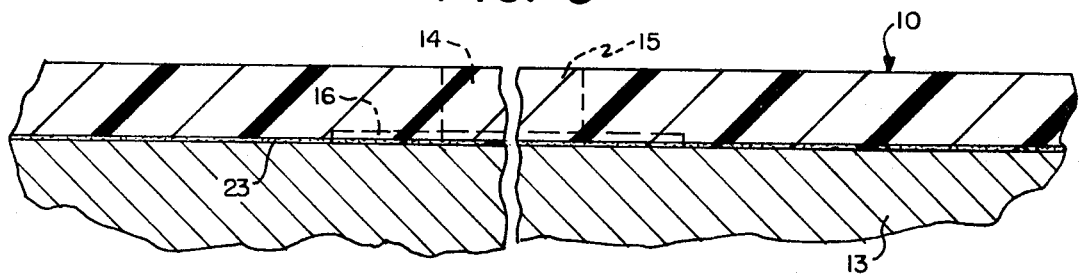
FIG. 3 is a detailed view of the installation of FIG. 2 after heat sealing of the film ends and bonding of the heat-shrunk cover.

In the installation of the fused cover, the film is heat shrunk to tight fitting relation to the surface of a process roll 13, as reflected in the fragmentary view of FIG. 3. A layer 23 of adhesive is provided over the surface of the process roll, typically after the heat-shrinking procedures. The adhesive, which can be of a type well known in the art, forms a continuous circumferential bond with the heat-shrunk covering bonding effectively with the chemically etched surfaces 11 of the film and also with the exposed surface of the bondable transition component 19.

The invention provides a simplified and wholly practical procedure for installing adhesively bonded, heat-shrunk coverings of non-adherent polymers to process rolls. This is realized through the provision of a novel transition strip which accommodates the otherwise mutually inconsistent conditions that the non-adherent film is required to be chemically etched or otherwise treated for satisfactory adhesive bonding, yet kept free of the reaction products of the etch or other treatment in the area of the fused seam. The transition strip enables the fused seam to retain its full integrity, while providing a readily bondable surface in the region of the seam, so that a continuous circumferential adhesive bond may be achieved in the final installation. The invention is useable to great advantage with high molecular weight, high viscosity thermoplastic materials such as Teflon FEP 160 (Du Pont) Kynar (Pennsalt, polyvinylidene fluoride), Aclar (Allied Chemical, fluorinated ethylene polymer), Tefzel, linear polyethylenes, polypropylene, nylon, for example.

It should be understood that the specific procedures herein illustrated and described are intended to be representative only, as certain changes may be made therein without departure from the clear teachings of the disclosure. Accordingly, reference should be made to the following appended claims in determining the full scope of the invention.

I claim:

1. A method for covering a large diameter process roll with an adhesively bonded film of heat shrinkable non-adherent polymer film comprising
   (a) supplying a web of the film, having a distended length somewhat in excess of the circumference of the process roll,
   (b) said web having a surface chemically etched for improved adhesive bonding, exclusive of narrow margins along the longitudinal edges of the web,
   (c) applying the web circumferentially about a process roll and bringing the longitudinal edges into abutting or slightly overlapping relation,
   (d) positioning a transition strip between the film and the process roll in the region of said longitudinal edges,
   (e) said transition strip comprising a pre-formed laminate structure of fusible and bondable components,
   (f) said transition strip having a width such as to closely correspond to the combined width of the said narrow margins of said web,
   (g) thermally fusing the longitudinal edge portions of the web to each other and to the fusible component of said transition strip, to form a tubular covering,
   (h) heat shrinking the tubular covering into snug fitting relation to said process roll, and
   (i) adhesively bonding the tubular covering to said process roll in substantially a complete circumferential bond including etched surface areas of the web and the bondable component of said transition strip.

2. The process of claim 1, further characterized by
   (a) said web being pre-fused to form a tubular pre-form,
   (b) the tubular pre-form being circumferentially distended and chemically etched,
   (c) the distended and etched pre-form being longitudinally slit, and
   (d) the reaction product of the etch being removed from narrow margins along said slit edges.

3. The process of claim 1, further characterized by said web having a thickness substantially greater than that of the transition strip.

4. A method for covering a large diameter process roll with a film of heat shrinkable fluorinated ethylene-propylene copolymer resin comprising
   (a) forming a tube of the said fluorinated ethylene-propylene copolymer resin having a diameter slightly less than the diameter of the roll to be covered,
   (b) distending the tube under heat and pressure to a diameter slightly greater than the diameter of the roll to be covered,
   (c) chemically etching the interior surface of said tube,
   (d) opening said tube subsequent to etching to provide a web of film having a pair of longitudinal edge margins,
   (e) removing the reaction product of said chemical etching from the longitudinal edge margins of said film,
   (f) loosely applying said film around said process roll with said longitudinal edge margins abutted or slightly overlapping,
   (g) placing a transition strip between the roll surface and the thus applied film, along the longitudinal edges of said film,
   (h) said transition strip being a pre-laminated structure and having a first surface heat sealable to said film and a second surface adhesively bondable to said roll surface,
   (i) heat sealing the longitudinal edge portions of said film together and with said transition strip,
   (j) heat shrinking said covering material into a tight fitting relationship with said roll surface, and
   (k) applying adhesive between the roll surface and the tube of film.

5. The method of claim 4, further characterized by said first surface of said transition strip being formed of said fluorinated ethylene-propylene copolymer resin and said second surface being formed of a bondable, heat-resistant material.

6. The method of claim 4, further characterized by said bondable material comprising of pre-plated surface of aluminum.

7. The method of claim 4, further characterized by said bondable material comprising polyimide film.

8. The method of claim 7, further characterized by each of the said fluorinated ethylene-propylene copolymer resin and polyimide components of the transition strip being approximately of ½ mil thickness.

9. In a process for applying a heat shrinkable film of non-adherent polymer, such as fluorinated ethylene polymer to the surface of large diameter process rolls including the steps of treating a surface of the film to improve its adhesion characteristics, positioning the film loosely around the circumference of the process roll with oppositely opposed edges abutting or overlapping, thermally fusing the edges of the film material to form a tube, heat shrinking the tube tightly onto the roll surface, and applying an adhesive between the inner surface of the film and the surface of said roll, the improvement comprising
   (a) removing the treatment from the surface of the film along margins of the edges to be fused,
   (b) placing a narrow transition strip between the inner surface of the film and the roll surface prior to thermal fusion of said edges,
   (c) said sealing strip having a first surface fusible with the film and a second surface adhesively compatible with said roll surface,
   (d) said first surface being joined with said edges during thermal fusion thereof.

10. A method for covering a large diameter roll with a film of heat shrinkable fluorinated ethylene-propylene copolymer resin, the steps which comprise forming a tube of the said fluorinated ethylene-propylene copolymer resin having a diameter slightly less than the diameter of the roll to be covered, distending said tube under heat and pressure to a diameter slightly greater than the diameter of the roll to be covered, chemically etching the interior surface of said tube, opening said tube subsequent to said etching step to provide a web of film having a pair of longitudinal edge margins of said film, removing the reaction product of said etching step from said longitudinal edge margins, loosely applying said film around the roll to be covered with said edge margins abutting or slightly overlapping, placing a transition strip between the surface of a roll to be covered and said longitudinal edge margins of said web of film, heat sealing the said longitudinal edge margins of said film together with said transition strip to form a tube of said film, heat shrinking said tube onto said roll surface, and applying adhesive between the roll surface and said heat shrunk tube.

References Cited
UNITED STATES PATENTS

| | | | |
|---|---|---|---|
| 3,426,118 | 2/1969 | Chapman et al. | 156—86 X |
| 3,481,805 | 12/1969 | Holmes et al. | 156—86 |
| 3,528,876 | 9/1970 | Bouhaben et al. | 156—218 X |
| 2,440,664 | 4/1948 | Irons | 156—218 X |

WILLIAM A. POWELL, Primary Examiner

U.S. Cl. X.R.
156—86, 215, 306